US008827708B2

(12) United States Patent
Christensen et al.

(10) Patent No.: US 8,827,708 B2
(45) Date of Patent: Sep. 9, 2014

(54) METHOD, SYSTEM AND COMPUTER PROGRAM PRODUCT FOR PROVIDING A SIMULATION WITH ADVANCE NOTIFICATION OF EVENTS

(75) Inventors: Nikolaj Christensen, Copenhagen (DK); Bo Belhage, Espergaerde (DK)

(73) Assignee: Laerdal Medical AS, Stavanger (NO)

( * ) Notice: Subject to any disclaimer, the term of this patent is extended or adjusted under 35 U.S.C. 154(b) by 869 days.

(21) Appl. No.: 12/351,604

(22) Filed: Jan. 9, 2009

(65) Prior Publication Data

US 2009/0215011 A1 Aug. 27, 2009

Related U.S. Application Data

(60) Provisional application No. 61/020,629, filed on Jan. 11, 2008.

(51) Int. Cl.
*G09B 19/16* (2006.01)

(52) U.S. Cl.
USPC .............................. 434/29; 434/43

(58) Field of Classification Search
USPC .............. 434/118, 219, 223, 262, 265, 268; 703/2, 19, FOR. 801, FOR. 578
See application file for complete search history.

(56) References Cited

U.S. PATENT DOCUMENTS

| | | | |
|---|---|---|---|
| 5,081,601 A * | 1/1992 | Eirikasson | 703/17 |
| 6,199,030 B1 * | 3/2001 | Stone | 703/8 |
| 6,918,771 B2 * | 7/2005 | Arington et al. | 434/262 |
| 7,536,287 B2 * | 5/2009 | Chussil et al. | 703/6 |
| 2003/0105620 A1 * | 6/2003 | Bowen | 703/22 |
| 2006/0166176 A1 * | 7/2006 | Lakin et al. | 434/262 |
| 2007/0055523 A1 * | 3/2007 | Yang | 704/257 |
| 2008/0131855 A1 * | 6/2008 | Eggert et al. | 434/266 |
| 2009/0112560 A1 * | 4/2009 | Woodbury | 703/17 |

* cited by examiner

*Primary Examiner* — Robert J Utama
*Assistant Examiner* — Sadaruz Zaman
(74) *Attorney, Agent, or Firm* — Birch, Stewart, Kolasch & Birch, LLP (57) ABSTRACT

A method, computer system and computer program product for providing a computer simulation that provides advance notification of expected events or states, comprising running a first computer simulation; running a second computer simulation corresponding to said first simulation, said second simulation having progressed further than said first simulation; and using said second computer simulation to provide information representing expected future events in said first simulation.

A first computer simulation may be based on a model of a simulated system, said model having a plurality of state variables. Input data from a first user input interface may represent user interaction with said first computer simulation, while input data from a second user input interface may represent the extent to which a condition should be present in said simulation. Input from the said second user input interface is translated to values for one or more state variables in said first computer simulation consistent with a description of said condition in terms of rules embodied in the model. The representation of expected future events allows interactive fine tuning of the condition in the model.

20 Claims, 10 Drawing Sheets

METHOD, SYSTEM AND COMPUTER PROGRAM PRODUCT FOR PROVIDING A SIMULATION WITH ADVANCE NOTIFICATION OF EVENTS

This Nonprovisional application claims priority under 35 U.S.C. §119(a) on Patent Application No(s). 61/020,629 filed in United States of America on Jan. 11, 2008, the entire contents of which are hereby incorporated by reference.

BACKGROUND OF THE INVENTION

1. Field of the Invention

The present invention relates to a method, a system and a computer program product for providing a simulation, and more particularly, to a method, system and computer program product for providing a simulation that provides advance notification of simulation events.

2. Description of Relevant Art

Computer simulations of the behavior of complex systems have become important in a number of contexts, including testing of complex models, simulation of the behavior of systems that are subject to stochastic variations, and particularly as a means for providing an opportunity to train students in manual and cognitive tasks that involves operating complex equipment or making decisions with respect to critical scenarios.

Typical examples of the latter include flight simulators, simulators for training operators of other vehicles or heavy machinery, simulators for training surgeons or medical personnel in operating or otherwise treating patients, and simulators for training operators of critical processes such as e.g. nuclear reactors.

Training simulators typically include a model of an environment including a description of any objects upon which the student or operator may perform actions, a set of variables representing states or conditions in the model, a set of rules such as physical processes and how they interact to change the values of the variables, and input/output interfaces for receiving user input and for displaying or otherwise representing the environment and any changes of that environment resulting from user interaction, interaction between objects in the environment, or changes in dynamic variables over time resulting from the progress of the simulation.

The creation of an environment and a particular training scenario, including initial conditions, objectives, etc., is often a complicated process which requires test runs of the simulation in order to verify that desired conditions develop as part of the simulation in a manner that allows a student to practice handling that particular condition. After the scenario has been created, changing it may require a halt in simulations, a complicated re-adjustment of parameters, and new trials and verifications. Furthermore, it may be difficult for an instructor or supervisor to know, based on a current situation in a simulation, whether the simulation is likely to develop a situation it is desirable that the student confronts and when this situation can be expected to occur.

SUMMARY OF THE INVENTION

The present invention is directed to a method, a system and a computer program product which includes a first simulation running at real time, representing e.g. a training environment and user controls used by a student and a second simulation running ahead of real time, representing a prediction of the development of the simulation in the near future. A supervisor, instructor or teacher may then supervise a student while being prepared for events before they occur, and according to some embodiments of the invention, even manipulate the training scenario in order to provoke or avoid certain situations or events.

A method consistent with the principles of the invention may present a simulation that provides advance notification of computer simulation events, e.g. states or conditions that are expected to occur, by running a first computer simulation, running a second computer simulation corresponding to said first simulation, said second simulation having progressed further than said first simulation, and using said second computer simulation to provide information representing expected future events in said first simulation.

According to certain embodiments, the first simulation is a real time simulation of a scenario on a model, while the second simulation is a simulation of the scenario on said model ahead of real time. Said second simulation may share a history of states with said first simulation up until a point in time in said second simulation corresponding with a current point in time in the first simulation. The method may further include generating a first representation of current states in said first simulation as a presentation of a current situation and a second representation of one or more states in said second simulation as a presentation of one or more predicted future situations. The one or more states in the second simulation may be chosen from a history of such states that have occurred after the point in time that corresponds with the current point in time in the real time simulation, thus representing a prediction of future states or situations in the first simulation.

According to some embodiments of the invention, it may be determined that a current state at a current point in time in the first simulation differs from a corresponding state at a corresponding point in time in said second simulation. Consistent with the principles of the invention, the second simulation may then be returned to said corresponding point in time and reset or reinitialize state variables to the states that correspond with the first simulation at that point in time. An accelerated calculation of a progress of the second simulation may then be performed until the second simulation again runs ahead of said first simulation.

According to some embodiments, the first representation—representing the real time simulation—may be presented on a first output device. The second representation—representing the prediction—may be presented on a second output device. This allows a student to observe the real time simulation while operating the controls of a first user interface, while an instructor may observe a prediction of near future events and be prepared before they occur.

Consistent with some embodiments of the invention, a state in said first simulation differing from a corresponding state in said second simulation may have been brought about as a result of receipt of user input received over a user interface. Such user input may be input that has been received as a result of a student manipulating the model using a first user interface. User input may also represent a supervisor manipulating the scenario using a second user interface.

According to certain aspects of the present invention, user input representing a supervisor's manipulation of the simulation may be translated into values for one or more state variables in the first computer simulation consistent with a description of a condition in the simulation in terms of rules embodied in the model.

Consistent with other aspects of the invention, a computer simulation may be controlled by running a first computer simulation based on a model of a simulated system with a plurality of state variables, receiving input data from a first user input interface, said input being representative of user interaction with said first computer simulation to change values of one or more of said state variables in a manner consistent with an interaction with the simulated system, and receiving input data from a second user input interface, said input allowing a user to adjust the extent to which a condition should be present in said simulation. The input from the second user input interface may be translated to values for one or more state variables in said first computer simulation consistent with a description of said condition in terms of rules embodied in the model.

According to some embodiments, the first user input interface is a student user interface and the second user input interface is a supervisor user interface. The condition that may be controlled in this manner may be an undesirable condition that can be at least partly overcome or counteracted by data received from said first user input interface.

Consistent with the principles of the invention, the one or more state variables may be integral parts of the simulation that dynamically interact with other state variables through rules embodied in said model.

In some embodiments of the invention, the reverse function may also be performed such that the values of one or more state variables in said first computer simulation to a representation of the extent to which a condition is present in said simulation.

According to some embodiments, the model may be a description of a human physiology and said condition is a pathological state. The pathological state may, by way of example, be chosen from the group consisting of hypovolemia, anaphylaxis, opoid poisoning, and severity of bleeding.

According to some embodiments, the model may be a description of a nuclear reactor, and the condition may be an unstable or critical condition in said reactor.

BRIEF DESCRIPTION OF THE DRAWINGS

Exemplary embodiments of the present invention will become more fully understood from the detailed description given hereinbelow and the accompanying drawings. These drawings are given by way of illustration only and, thus, are not limiting on the present invention. In these drawings, like reference numerals represent like elements, wherein.

DETAILED DESCRIPTION OF EXEMPLARY EMBODIMENTS

The present invention is directed to methods, systems and computer program products for providing a simulation, and more particularly, for providing a simulation that provides advance notification of simulation events. The following description presents exemplary embodiments of such methods, systems and computer program products and various aspects thereof that are consistent with the principles of the invention. It must be noted that the exemplary embodiments are intended to provide a better understanding of the invention, and that they should not be interpreted as limitations to the invention, the scope of which is defined by the appended claims.

Figure 1A:
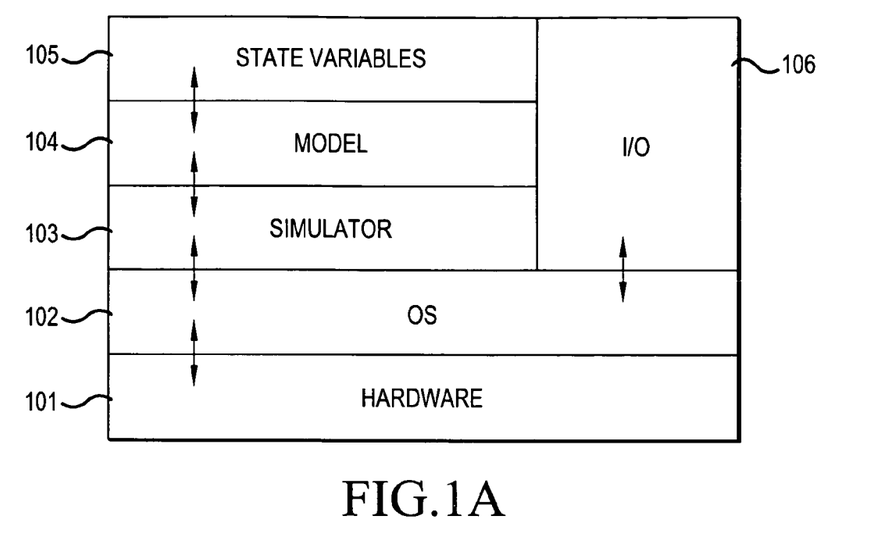
FIGS. 1A and 1B is a diagram illustrating an exemplary architecture of computer simulation systems.
Figure 1B:
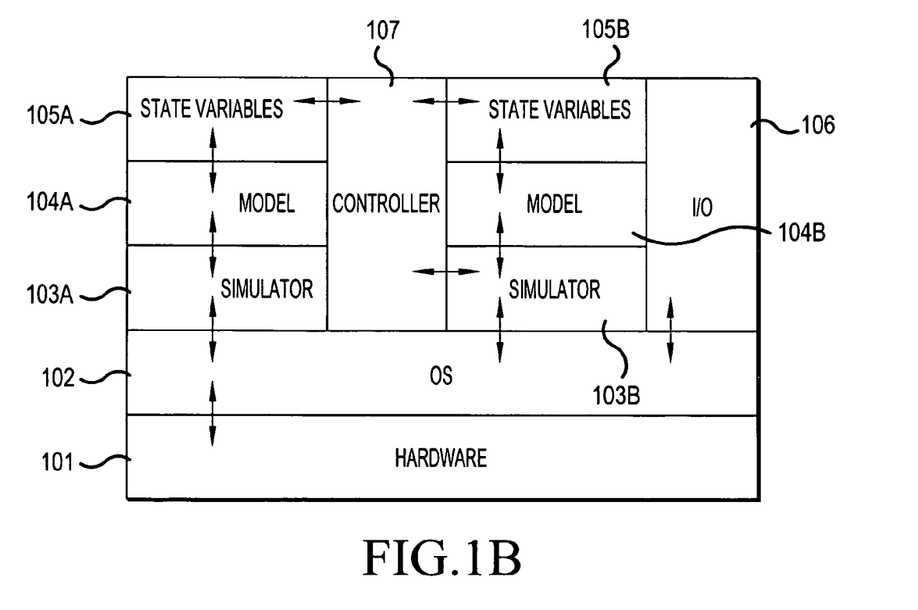

FIG. 1 shows in a block diagram, a system consistent with the principles of the invention. FIG. 1A shows how the system may include a hardware layer 101, an operating system layer 102, a simulator 103, a model 104, a set of state variables 105, and user input/output interface 106. The hardware layer 101 represents processing unit(s), memory and other components of the computer system running the simulation. The operating system layer 102 administers the access to system resources (the hardware layer) by the software running on the system. Depending on the type of simulation, particular real time capabilities may be required by the operating system in order to ensure access to system resources in a manner that will allow the simulation to progress and respond in a convincing manner.

The simulator 103 may be the software running the actual simulation. The software may include the necessary instructions for accessing the description of the simulation environment as described in a model and in dependence on received user input.

The model 104 is the description of the environment including any rules for how state variables change under influence of each other and user input. The state variables 105 represent conditions in the model and may change deterministically or randomly in dependence of the rules of the model as applied by the simulator under influence of user input. The state variables 105 may be written to a log file (not shown) such that the progress of the simulation may be replayed or examined after the simulation is finished.

The input/output interface 106 or interfaces represent the interfaces to external devices such as e.g. display, sound and tactile output units and input units such as keyboard, mouse and joystick, or input controllers that may be specific to the particular simulation running on the system.

FIG. 1B shows an example of a simulation running in accordance with aspects of the present invention. According to this particular embodiment of the invention, two instances of the simulator 103A, 103B have been loaded into system memory and are running concurrently. They are operating on separate instances of the model 104A, 104B, and on separate sets of state variables 105A, 105B. According to certain aspects of the invention, the second simulator 103B may be running the same simulation as the first simulator 103A, but ahead of time, in the sense that the state variables 105B of the second simulations represents the expected values of the state variables 105A of the first simulator 103A a certain period into the future.

Consistent with the principles of the invention, the user provided input to the simulation may be delivered as input to the first simulator 103A. Output from the first simulator 103A may similarly be presented to the user over a first set of output units as the present condition of the simulation, representing the simulated reality the user interacts with. The output from the second simulator 103B may be presented on a separate set of output devices e.g. to an instructor, representing the expected future situation in the simulation if the user does not interact with the simulation.

A separate software module referred to as a controller 107 may also be loaded into system memory. The controller may monitor the state variables 105A and 105B in order to detect if certain conditions occur. According to some embodiments of the invention, the controller 107 compares the current values of the state variables 105A of the first simulation with the corresponding values of the state variables 105B of the second simulation. Corresponding values may be logged values of the second simulation from a point in time in that simulation corresponding with the current values of the first simulation. By way of example, if the second simulation is running 10 minutes ahead of the first simulation, the controller 107 may compare current values of the state variables 105A of the first simulation with the corresponding values of the state variables 105B logged 10 minutes earlier.

According to certain aspects of the invention, the simulators 103A, 103B and models 104A, 104B may be instances of the same software. Consequently, if no user input is provided to the first simulation (and if the simulation includes generation of random numbers, the same generated numbers are used for both simulations), the results of the simulations will be the same, only shifted in time. However, if the user provides input to the first simulation causing a change in the state variables 105A of the model 104A, the simulations may start to drift apart. If the controller 107 detects such a situation, the controller may change the state variables 105B of that simulation and instruct the second simulator 105B to start with the updated variables and run on accelerated time until again it is ahead of the first simulation with the desired amount of time.

According to an alternative embodiment of the invention, only one instance of the simulator 103 and one instance of the model 104 may be loaded. According to this embodiment provided that the simulator includes the functionality of the controller 107. The simulator must also be able to operate on two sets of state variables 105A, 105B.

Figure 2:
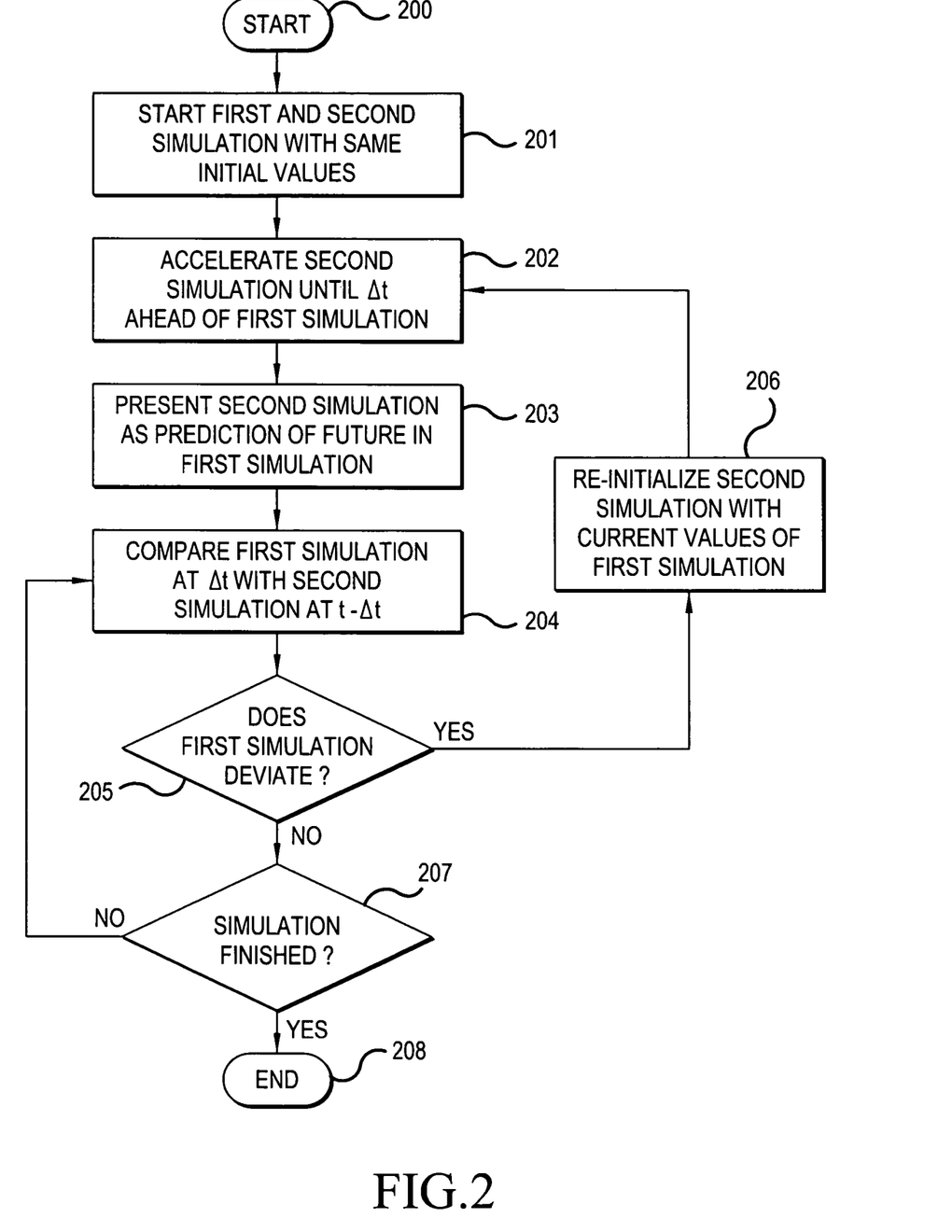
FIG. 2 is a flow chart illustrating a method in accordance with the invention.

FIG. 2 illustrates in a flowchart an example of how a simulation running in accordance with principles of the present invention may progress.

The method starts in a startup step 200. In a first step 201 the first and second simulations are initiated with the same model and the same values for all relevant state variables. In a next step 202 the second simulation, representing the prediction, is accelerated until it is ahead of the first simulation with a predetermined time Δt, speaking in terms of simulation time. Relevant values or states in the second simulation is presented in step 203 as predictions of expected future values or events in the first simulation. The amount of information actually presented may vary according to design criteria, and may range from alerts that are only issued when certain states or events are detected, to a continuous output of all relevant values. The presentation may also include only "current" prediction values, i.e. the values that are Δt ahead of the first simulation, or a "history of future values" may be presented, e.g. in the form of a curve illustrating the expected development of a value from time t to time t+Δt in the first simulation.

In a next step 204, all relevant values of state variables in the first simulation are compared with corresponding values of the same variables in the second simulation, logged at time t−Δt. In other words, values in the real time simulation for the time now is compared with what the prediction simulation predicted for the time now some time ago. If the first simulation is found to deviate from the prediction 205, the second simulation may be re-initialized with the current values of the first simulation and returned to step 202 to be accelerated.

As long as the first simulation does not deviate from the prediction, which is to say that the prediction was correct, and as long as the simulation is not found to have finished in step 207, the monitoring of step 204 continues. When the simulation for some reason is determined to have concluded in step 207, the process terminates.

It will be understood that while the example of FIG. 2 is shown as a sequence of consecutive steps, some steps may be performed simultaneously or in a different order. For instance, the comparison of values in the two simulations may be ongoing while the second simulation—the prediction—is accelerated, it does not have to wait until the second simulation is Δt ahead of the first simulation. Similarly, the presentation of values, e.g. on a display, may be performed continuously, while the simulation is running.

User interaction with the simulation has not been illustrated in FIG. 2 in order to simplify the explanation.

Figure 3:
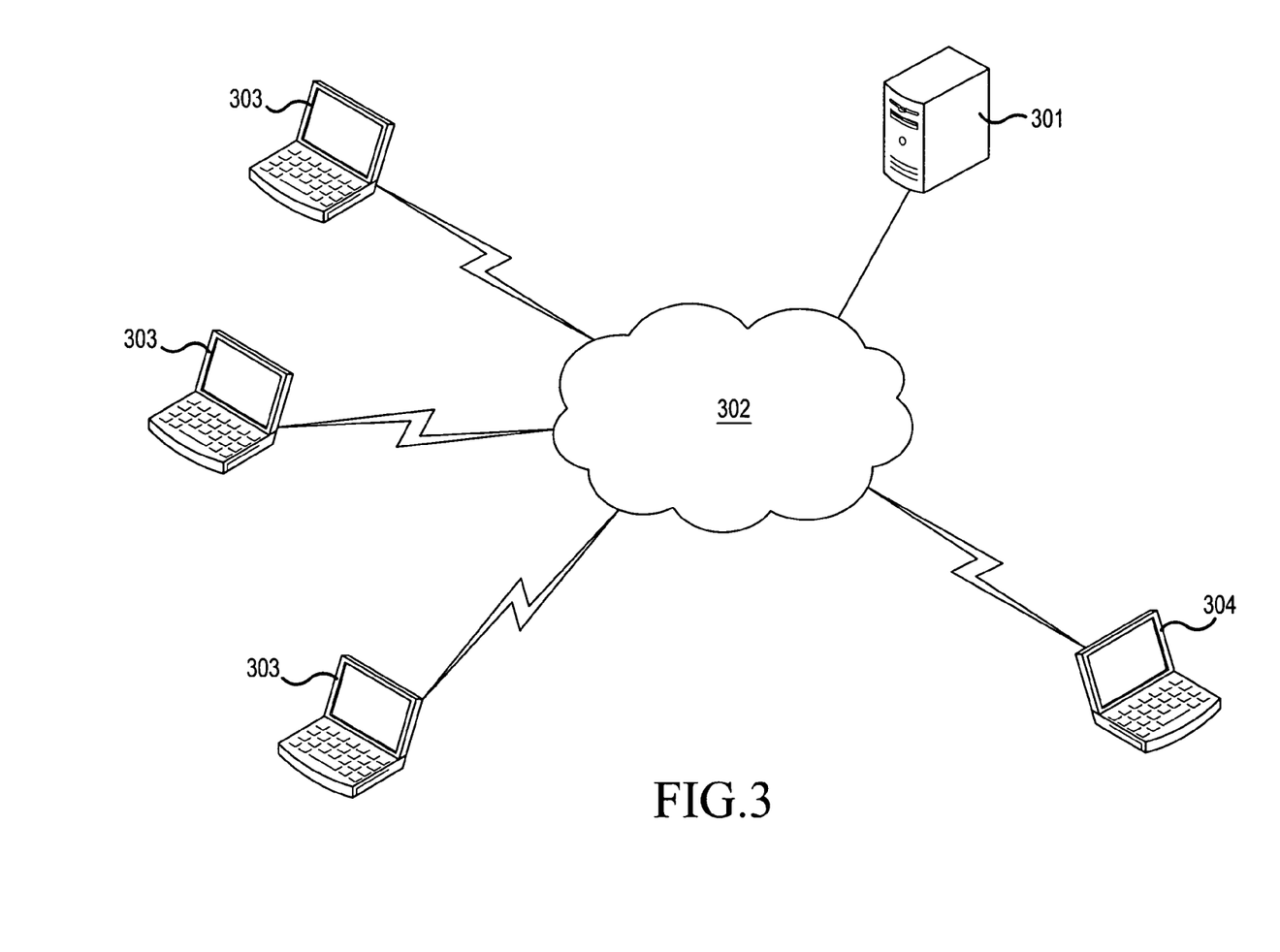
FIG. 3 shows a network of computers configured to operate in accordance with the invention.

Reference is now made to FIG. 3, which shows an embodiment of the present invention wherein a simulator runs in a network of computers. The computer upon which the simulation is running will be referred to as a server computer, while additional computers accessing the simulator will be referred to as client computers. According to this exemplary embodiment, a server 301 is running a simulator that operates in accordance with the principles of the invention. The server 301 is connected to a network, illustrated here as a network cloud 302. The network may be a local area network, LAN, or a wide area network such as the Internet. The communication over the network 302 may be based on well known communication standards and protocol such as Ethernet, TCP/IP, HTTP etc.

Three client computers 303 may be operated by students and connected to the network 303, e.g. over wireless links. A fourth client computer 304 may be operated by an instructor. Consistent with principles of the invention, the student client computers may be given access to a real time simulation running on the server 301, but not to a prediction simulation running ahead of the real time simulation. The fourth client computer 304 may be given access to a real time simulation and a prediction simulation running on the server 301. The real time simulation may correspond with the simulation running on simulator 103A in FIG. 1B, while the prediction simulation may correspond with the simulation running on simulator 103B in FIG. 1B.

Figure 4:
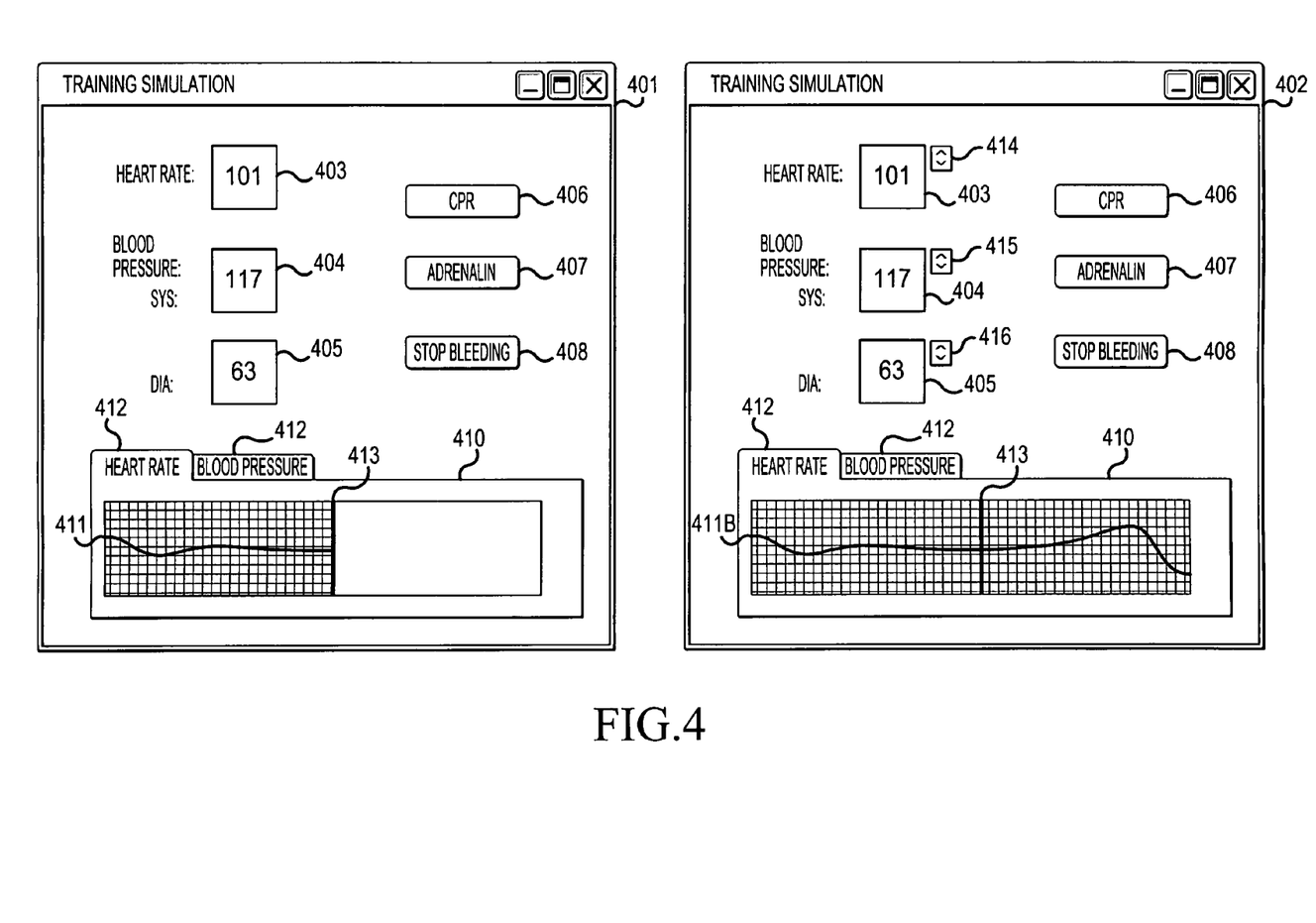
FIG. 4 shows two user interfaces illustrating aspects of the invention.

Turning now to FIG. 4, two screen shots illustrate an example of a simulation as it may be presented over an input/output interface 106 of a computer system, such as server 301, running a medical simulation.

According to the exemplary embodiment shown in FIG. 4, the simulation running on a simulation server 301 is that of a patient which has been subject to some injury. In order to simplify this explanation and facilitate understanding, the example only includes a limited set of parameters, or state variables, and input controls. A real example would be likely to be more sophisticated.

A first user interface 401 represents the controls and output presented to a student operating a client computer 303. The user interface provides the user with a display including three state variables of the simulation, representing respectively the patient's Heart Rate 403, Systolic Blood Pressure 404, and Diastolic Blood Pressure 405. Three buttons represent procedures the student may apply to the patient, including applying CPR 406, giving adrenalin 407 and stop bleeding 408.

The user interface is further provided with a graphic area 410 which includes a curve 411 illustrating the development of at least one of the variables 403, 404, 405. According to the exemplary embodiment illustrated in FIG. 4, the student can change between a curve illustrating the development of the patient's heart rate and the patient's blood pressure using tabs 412. In the illustrated example, heart rate is selected, and the curve 411 shows the development of the patient's heart rate up to a current point in time, illustrated by a vertical line 413 at the end of the curve 411.

The student may now, based on his or her evaluation of the condition of the patient as indicated by the state variables 403, 404, 405, and the graphic presentation of the patient's development in the graphic display 410, apply procedures by clicking buttons 406, 407, 408. The simulator 103A will change state variables in accordance with the received user input, and the state variables may change. It will be understood that the underlying model 104A may include additional state variables 105A in addition to those visible to the student.

A second user interface may represent the same interface to an instructor on a client computer 304. Consistent with the principles of the invention, the user interface presented to the instructor may include additional information and input controls. The various parts of the instructor user interface 402 that correspond with similar parts of the student user interface 401 are given the same reference numbers in the drawing. The additions to the instructor user interface as illustrated in the drawing includes a curve 411B that progresses past the line 413 representing the current point in time. The part of the line that extend past the vertical line 413 to the right, represents an expected development of the illustrated variable provided that the student does not apply any procedure to the patient. This expected development, or prediction, represents the state variables 105B of the prediction simulation running on simulator 103B.

The instructor user interface 402 includes the same user input controls 406, 407, 408 provided on the student interface 401. In addition three controls associated with the three state variables are provided in the form of spin buttons. A first spin button 414 allows the instructor to change the heart rate of the patient directly. A second spin button 415 allows the instructor to change the systolic blood pressure, and a third spin button 416 allows the instructor to change the diastolic blood pressure directly. Using these controls the instructor can directly manipulate the situation without being limited to the controls that represent ordinary user interaction with the simulation. This may allow the instructor to create (or avoid) situations in a manner that is desirable in order to promote training. By way of example, the instructor can create a situation where the patient will go into cardiac arrest within a short period in time in order to let the student or students confront such a situation. Using the prediction simulation displayed as curve 411B, the instructor will be able to finely tune the changes to the variables such that the desired situation occurs within a period of time that is in accordance with the needs of the training situation and the time available.

Consistent with certain principles of the invention, the user controls provided to the instructor may adjust several parameters simultaneously in a consistent manner. By way of example, instead of adjusting the systolic and diastolic pressure independently, the instructor user interface may be provided with a single control for adjusting blood pressure, and the respective adjustment of the state variables representing the systolic and diastolic pressure may be calculated by the simulator based on the rules of the model and the values of other state variables in a direction indicated by the instructors application of the blood pressure adjustment. Similarly, the adjustment of one state variable, such as the systolic blood pressure 415 may result in a consistent change in the diastolic blood pressure variable even if the instructor has not used the corresponding control 416, provided that the model 104A dictates such a change.

The simultaneous adjustment of several state variables by the instructor through user interface controls will be described in further detail below.

As described above, if user input, either through the student controls 406, 407, 408 or the additional instructor controls 414, 415, 416, changes the state variables such that the prediction no longer corresponds with the real time simulation, the prediction simulation will return to a current time and accelerate simulation until the prediction again is running the predetermined time ahead of the real time simulation.

Figure 5:
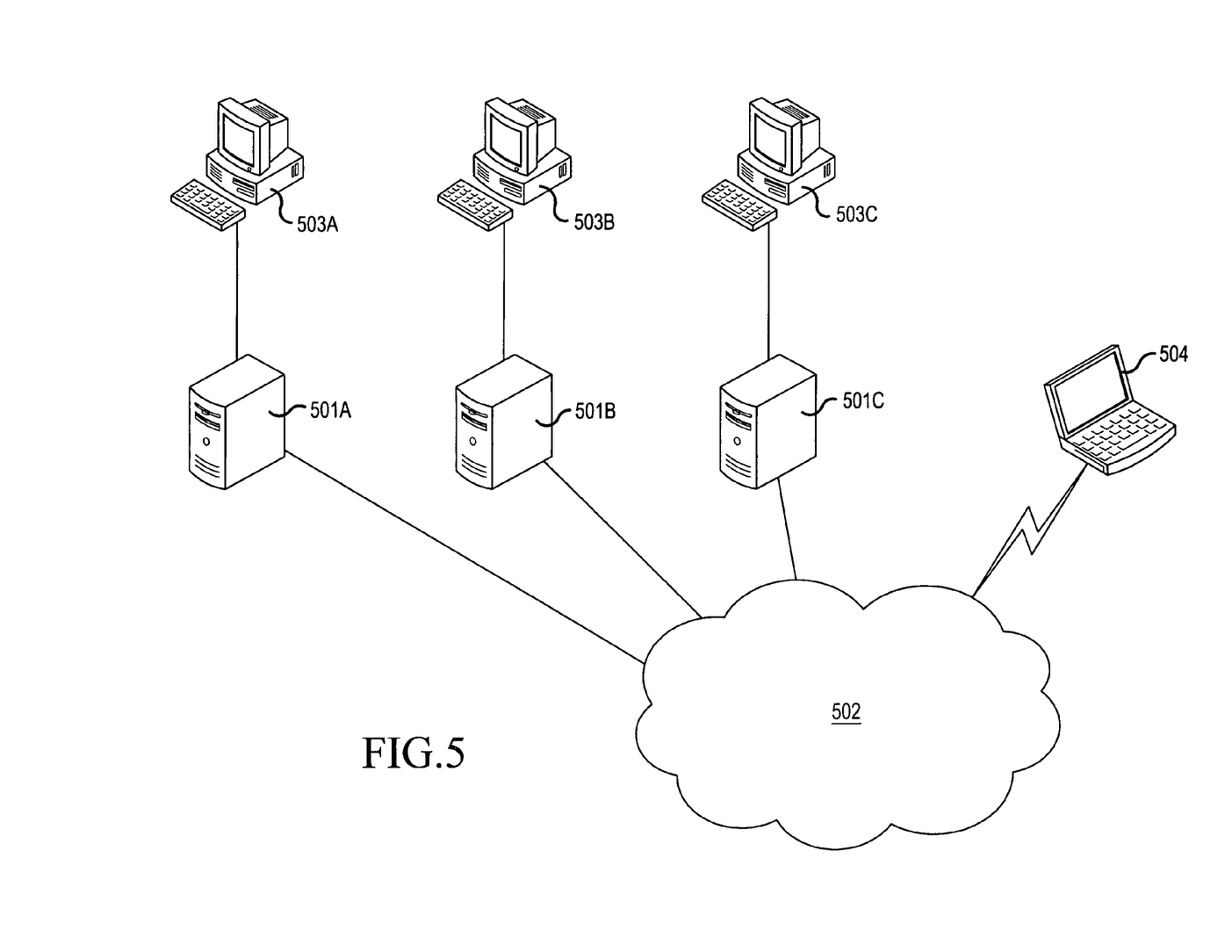
FIG. 5 shows a network of server computers and client computers configured to operate in accordance with aspects of the invention.

Turning now to FIG. 5, an example is provided wherein several simulations are running on respective servers. Continuing with the example from FIG. 4, the servers 501A, 501B, 501C may e.g. represent respective patients. The servers 501 may be connected to a network 502 corresponding with the network 302 of FIG. 3. According to the example illustrated here, each student is provided with a respective client computer 503A, 503B, 503C. The client computers 503 are connected to the servers 501 such that students may interact with a simulation running on a respective server 501, e.g. using the user interface 401 illustrated in FIG. 4.

An instructor client computer 504 may also be provided. Consistent with the principles of the invention, the instructor client computer may be connected to the network 502 and capable of logging in to any one of the simulation servers 501. In this way an instructor may be able to monitor the work of any one of the students, and interact with any one of the ongoing simulations, e.g. by using the instructor user interface 402 of FIG. 4. According to some embodiments of the invention, the instructor client computer may also be capable of interacting with several servers 501 simultaneously, for instance in order to create the same situation for all students, designing a scenario, monitoring critical conditions in any one of the simulations etc.

Consistent with the principles of the invention, the simulations running on each of the servers may be independent of any communication with a client computer. This means that if all communication with client computers are lost, such that the simulation server does not receive any input from neither student nor instructor, the simulation may continue running on the server. This may be particularly useful in situations where a plurality of servers represent several different situations students must deal with as they encounter them, and where the various simulations running on the respective servers keep developing whether they are attended to by students or instructors, or not. An example of such a situation may be where each simulator/server is embedded in a manikin representing one of several victims to an accident, wounded on a battlefield etc. In such a scenario, the medical condition of each victim may be simulated, and may develop while students decide priorities, diagnose and treat victims. An example of such a scenario will be described in further detail below.

Figure 6:
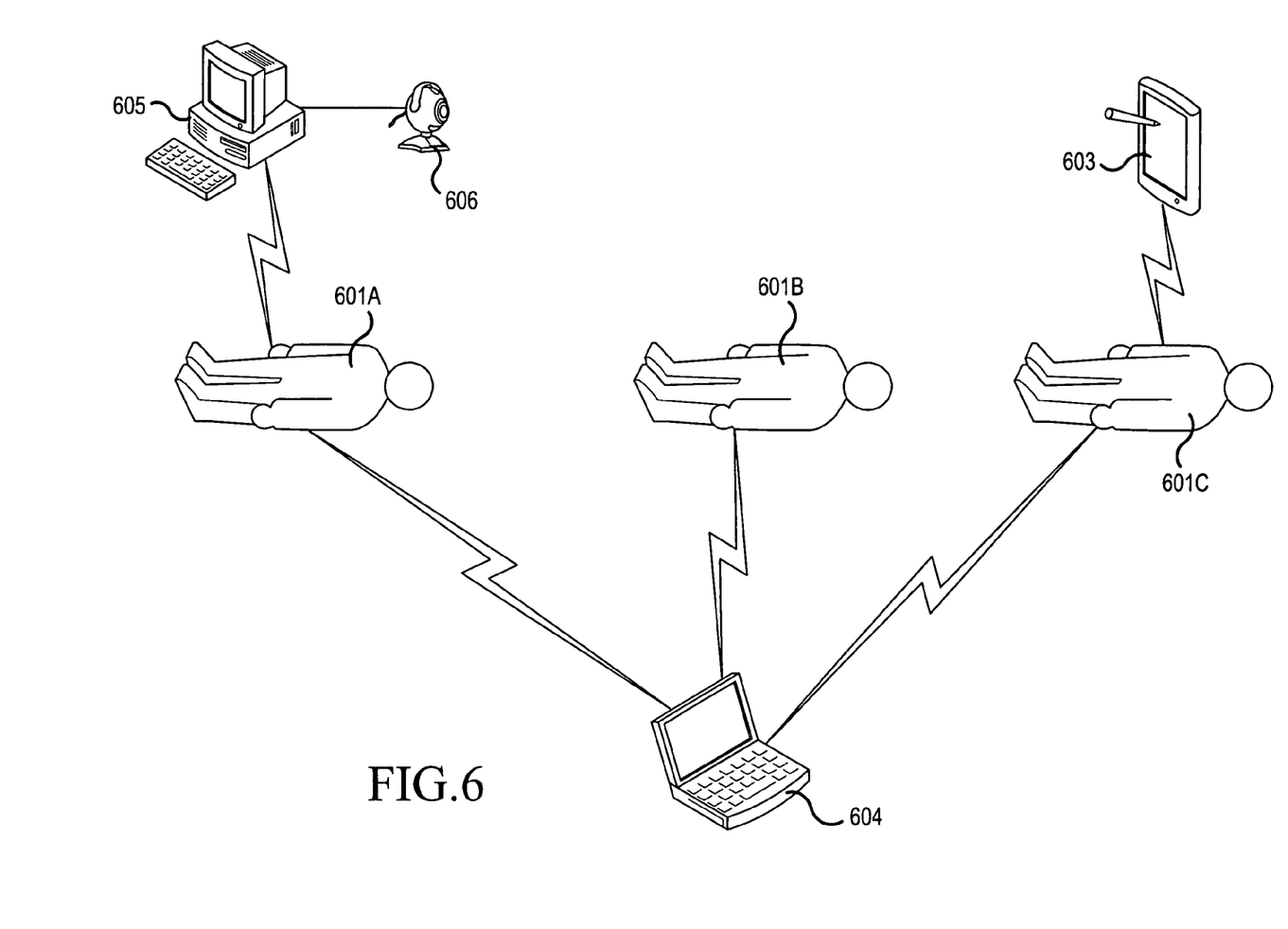
FIG. 6 shows a plurality of manikins with embedded simulation servers and a plurality of client computers configured to communicate with the embedded servers.

FIG. 6 illustrates the same situation as that illustrated in FIG. 5, but according to this embodiment, the simulation servers are embedded in manikin dolls representing patients. According to this example, each manikin 601A, 601B, 601C may, in addition to the embedded simulator, include tactile controllers that simulate heartbeat, bleeding etc., and that are capable of reading user input in the form of CPR, treatment of bleeding wounds etc. Such controllers may replace the client computers 503 of FIG. 5 and the corresponding user interface 401 illustrated in FIG. 4. The manikins 601 may further include wireless communication capabilities in order to communicate with an instructor client computer 604. The instructor client computer 604 may display an instructor user interface such as that illustrated at 402 in FIG. 4. An instructor may then be able to interact with the simulators running in the manikins as described above.

It will be understood by those with skill in the art that additional equipment may be included in the system in order to provide e.g. video and sound. While not illustrated in the drawing, such equipment, e.g. in the form of microphones and video cameras, may be located near some or all of the manikins in order to provide an instructor with the ability to observe activity at each location and to communicate with students using video conferencing technologies. An instructor may even communicate with students using voice communication equipment embedded in the manikin. Based on the instructors knowledge of the state of the manikin he or she may provide information to the students similar by pretending to be the patient speaking to the personnel treating him, describing where he feels pain etc.

Also illustrated in FIG. 6 is a patient monitor computer 603. The patient monitor may correspond with the user interface 401 of FIG. 4, but since user input from the student may be provided directly to the input interface of the manikin 601, the monitor computer may according to this example, only provide output that represents such data as might be available from a patient monitor in a real situation, such as e.g. blood pressure and pulse. According to some embodiments of the invention, the monitor computer may provide the student with the ability to perform or initiate actions or procedures that are not easily performed directly on the manikin. Examples of such actions include intravenous injections of any of a number of available drugs, saline solution, blood transfusion etc. Manual actions such as CPR, application of bandages, cervical collar and oxygen mask may still be performed directly on the manikin.

A debrief computer 605 is also illustrated. The debrief computer may be configured to log all events that happen during a simulation, either in real time over a network, or by downloading logged data from some or all of the other computers that are part of the simulation, including the manikins 601, the monitor client computer 603, and the instructor client computer 604. The debrief computer 605 may also be connected to a video camera 606. Video recorded by the debrief computer 605 may be used to enhance the evaluation of a scenario through the presentation of logged data and logged video in a consistent manner.

Figure 7:
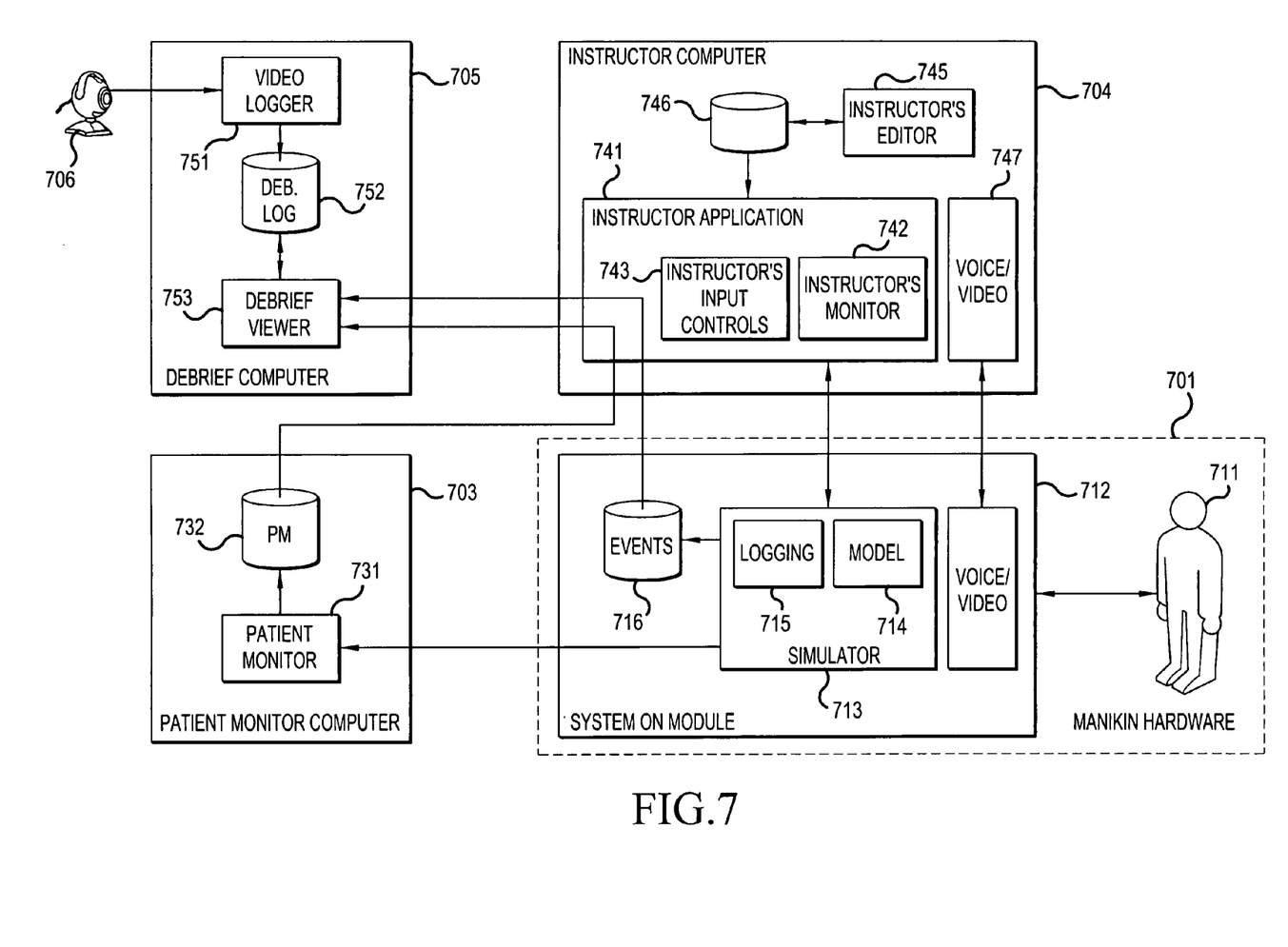
FIG. 7 shows a number of components and modules that may be included in a system according to the invention.

FIG. 7 is an illustration of various components or modules that may be included in a system such as that illustrated in FIG. 6. A manikin 701 may comprise manikin hardware 711 with the necessary user input/output interface capable of outputting information about the state of the patient through such parameters as pupil size, pulse, bleeding etc, and to receive input from a student in the form of manual actions performed on the manikin, such as CPR and bandaging. The manikin hardware 711 may further include an embedded system on a module 712. The embedded system 712 may be a computer upon which is installed a simulator 713 in accordance with the present invention, upon which a real time simulation and a prediction simulation may be running. The simulator may include a model 714 as described above (and including necessary state variables), and a logging module 715. The logging module may be configured, or include program instructions to, store events in memory 716.

The simulator may further be in communication with embedded wireless or wired communication capabilities included in the manikin but not illustrated in the drawing. A patient monitor computer 703 may be included in the system.

The patient monitor computer 703 may include a patient monitor module 731 configured to receive information from the simulator 713 and present this information on a display (not shown) or store them in memory 732. The patient monitor may only be configured to receive and present or store information, or alternatively also to transmit certain types of information back to the simulator 713, as described above.

An instructor computer 704 may include an instructor application 741 with an instructors monitor module 742 and instructors input control module 743. The instructors monitor module 742 may present information received from the simulator 713, including real time information and prediction information, as described above. The instructor's input control module 743 may present the instructor with input controls that allows the instructor to interfere with the simulation by performing actions or procedures on the patient, or by manipulating state variables directly. The instructor's monitor 742 and input controls 743 may be presented to the instructor on a user interface consistent with the principles discussed with reference to FIG. 4.

It should be understood that the instructor's modules may include several sub modules operating on different types of data or displaying different types of information that are part of the real time simulation or the prediction.

The instructor module may also include an instructor's editor 745 configured to provide the instructor with an environment for creating simulation scenarios. Simulation scenarios created with the instructor's editor may be stored in memory 746 on the instructor's computer 704 from where it may be uploaded to simulators 713 to initiate the state variables and possibly adjust the model 714 prior to a simulation.

The instructor's computer 704 may further include a voice and/or video conferencing application 747 configured to communicate with a similar application 717 in the system 712 embedded in a manikin 701. This may provide an instructor with the ability to communicate with students during a simulation without actually being present at the same location. The instructor may also play the role of the manikin, describing his condition as discussed above.

A debrief computer 705 may be provided in order to present students and instructors with an ability to evaluate the performance of students during a simulation. The debrief computer 705 may be connected to one or more video cameras 706 from which it receives video of students performing actions on manikins. The video may be received by a video logger module 751 which stores the received video data in a debrief log memory 752. The debrief computer may further include a debrief viewer module 753 which is configured to receive and store data received from any of the other computers in the system, including the embedded system 712, the patient monitor computer 703 and the instructor computer 704. Consistent with principles of the invention, data may be received directly from the computer where they were generated, or they may be forwarded by any other part of the system. In the example illustrated in FIG. 7, data from the event log 716 of the embedded system 712 in the manikin 701 and data from the patient monitor log 732 are sent to the instructor computer 704, where they may be logged, and forwarded to the debrief computer 705.

The debrief computer 705 may be used to present students and instructors with a replay of any logged or recorded data in a manner that facilitates evaluation of the student's performance. In some embodiments of the invention a replay may be performed by feeding the logged input from the student as input to a new simulation. This may require that the simulation is deterministic, or that random numbers or events that have been used by or occurred in the simulation have also been logged, or that such numbers or events are independent of the part of the simulation that is determined by the actions of the user.

Figure 8A:
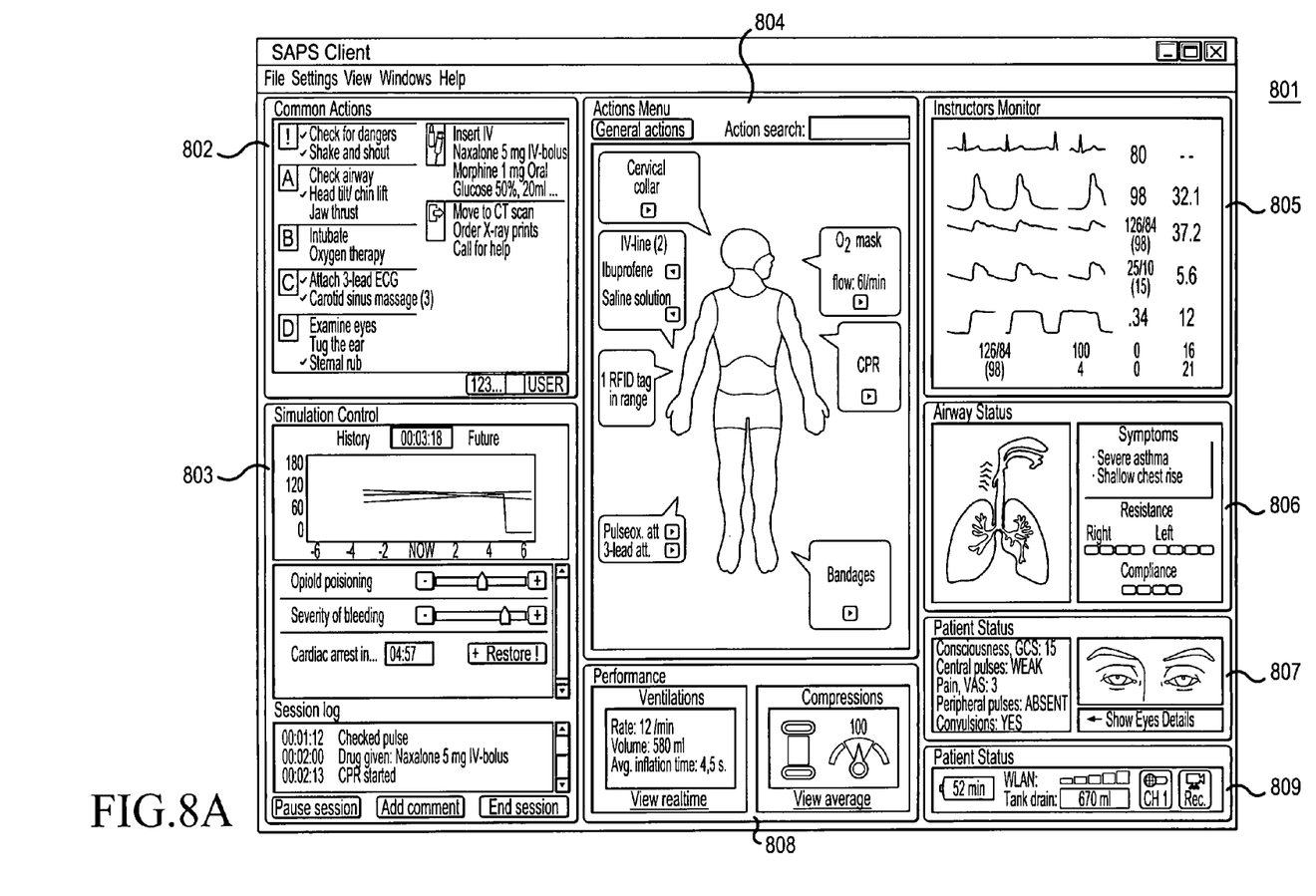
FIGS. 8A and 8B shows two user interfaces illustrating further aspects of the invention.
Figure 8B:
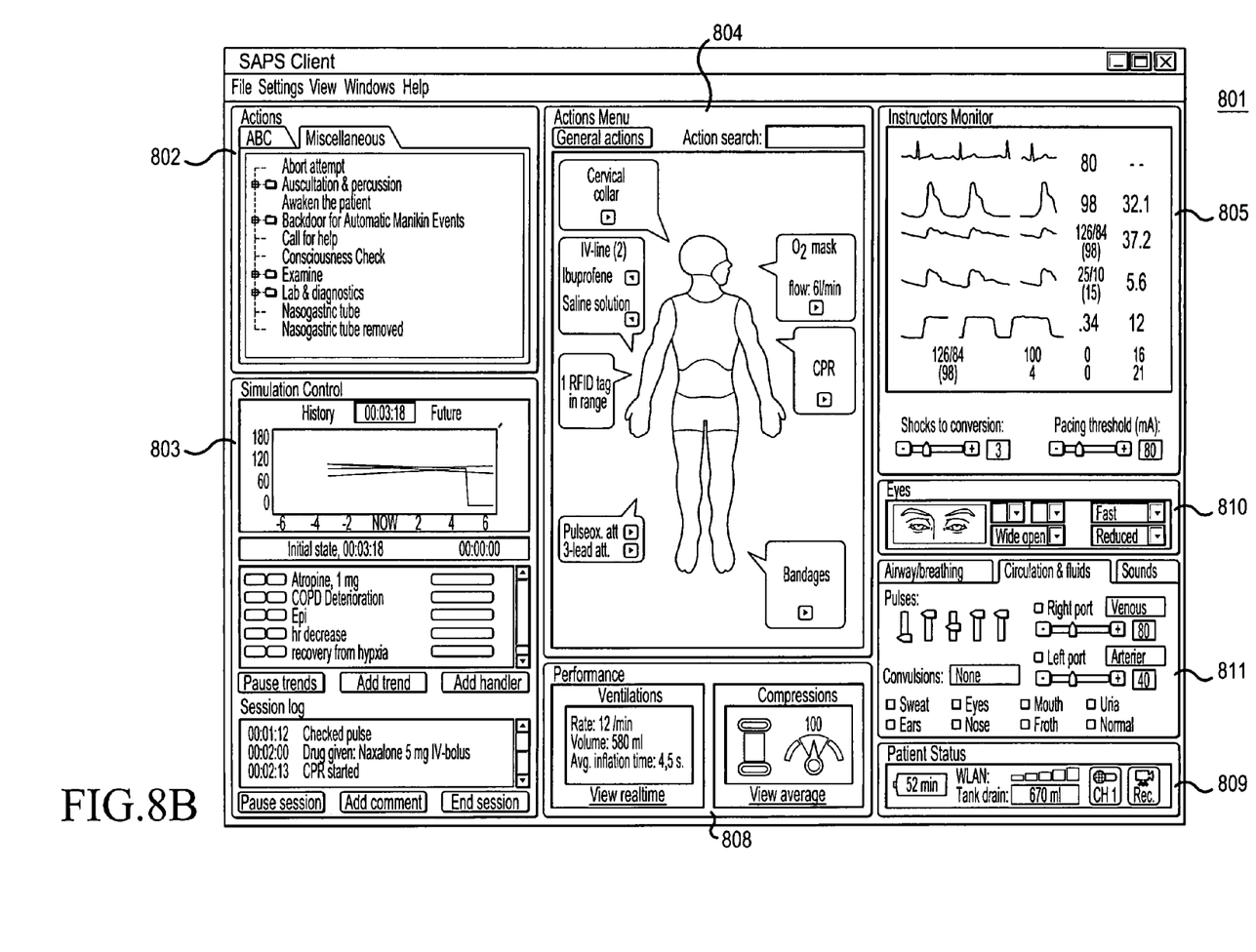

Reference is now made to FIGS. 8A and 8B, which illustrate a more detailed example of an instructor interface comparable with 402 of FIG. 4. In the example provided in FIG. 8, the instructor interface is capable of displaying information in two modes, which may be referred to as monitoring mode, shown in FIG. 8A, and instructor mode, shown in FIG. 8B. According to this example, no student interface to correspond with 401 of FIG. 4 is provided. Instead, the student or students may interact with the simulation using a manikin with embedded sensors, controllers and actuators such as that described with reference to FIG. 6. In the two drawings, sections or areas of the user interface that correspond with each other are given the same reference number.

Turning first to FIG. 8A, an interface 801 is provided which presents a monitoring view of a simulation. A first area 802 of the interface according to this example presents a list of common actions. The list of common actions 802 may be used as a checklist of actions performed by the student.

A second area 803 presents simulation control, and presents the history and predicted future development of the simulation. Included in this area is a graphical presentation of the historical and future development of certain values, a number of controls that allow the instructor to interfere with the simulation, and an alert that in this case informs the instructor that cardiac arrest will occur in 4:57 minutes. The simulation control area 803 also presents a log of actions performed by the student during this session. Finally, controls are provided that allows the instructor to pause the simulation, to add comments to the log, or to end the session.

In an area 804 in the center of the user interface a representation of the patient is provided. This area provides access to a menu of actions that may be performed on the patient, and may correspond with a student user interface used in a setting where the student is not working on a manikin but on a student client computer as discussed with reference to FIG. 3, FIG. 4, and FIG. 5. This actions menu area 804 may be used by the instructor to perform actions as would a student. Actions provided in this particular example of a user interface include application of a cervical collar, introduction of ibuprofen and saline solution through IV-lines, attachment of monitoring equipment such as pulse oximeter and 3-lead defibrillator, application of an oxygen mask, CPR and bandages.

In a next area 805 an instructor's monitor is provided. This monitor represents the status of various variables in the simulation and may correspond with what a student may see on a monitor provided that he has attached a pulse oximeter to the patient.

An airway status area 806 provides the instructor with information about status and symptoms relating to the respiratory system of the patient, and a patient status area 807 presents other symptoms or observations that can be made, such as consciousness according to the Glasgow Coma Scale (GCS), pulse, Visual Analog Scale (VAS) pain score, convulsion, bleeding and observation of eyes. The status of the patient may be based directly on the various values of the state variables in the simulation model, and may be more accurate than that which may be observed by a student.

A performance area 808 may present the performance of the student at performing various actions, exemplified here as measures relating to ventilations and compressions during CPR.

Finally, a technical status area 809 may present technical details relating to the simulator computer system, including remaining power in a battery, quality of a wireless (W-LAN) connection, remaining fluid in a tank holding liquid used to represent bleeding, and communication channels for audio and video communication and recording.

FIG. 8B represents an alternative mode of the user interface presented in FIG. 8A. Only the differences between the two modes will be described below.

The action area 802 has now changed to present a hierarchical list of available actions. This list may be used to systematically activate and log actions.

The simulation control area 803 still presents the graphical view of history and prediction consistent with the principles of the invention. Some of the controls presented in the monitoring mode of FIG. 8A have been replaced by other more detailed controls, and the possibility to freeze trends, add trends and add handlers. According to one aspect of the invention, an instructor using a freeze trend control may be able to lock a pathological situation in the sense that it is not allowed to develop further even if the model otherwise requires this (e.g. temporarily running the simulation with a given bleeding rate, but without reducing the amount of blood). According to another aspect of the invention, controls either of the student interface or the instructor interface can be removed or made available as a result of an instructor's manual input using the add handlers control of the instructor interface. Handlers may also be added or removed based on the present condition in the model.

The instructor's monitor area 805 presents the instructor with the same information as in the monitoring mode, but additional controls are added, allowing the instructor to influence the status of the patient directly.

The airway status area 806 and patient status area 807 have been replaced by an eyes area 810 and a patient control area 811. The eyes area allows the instructor to change the appearance of the eyes, including the size of the pupils, how open the eyes are, the blinking rate, and the pupils' response to light. The patient control area 811 allows the instructor to adjust additional status variables or conditions of the patient, including airway/breathing, circulation and fluids, and sounds made by the patient. In this example, various controls for manipulating the circulation and fluids of the patient are shown in more detail, including pulses in various parts of the body, convulsions, secretions, bleeding rate, etc.

The various values shown in FIG. 8A and FIG. 8B may represent values that are received from the simulation server, either as part of the real time simulation, or as part of the prediction simulation, as described above. The various controls available to the instructor allows the instructor to interact with the simulation by changing certain values of the state variables of the simulation. As described above with reference to FIG. 4, some controls may give the instructor direct access to one particular variable of the model, such as e.g. the heart rate of the patient. However, the various variables may, depending on the rules describing the model, influence each other in a manner that makes it inconvenient to change one variable directly, and may even result in unpredictable behavior.

According to certain aspects of the invention the controls accessible to the instructor may therefore invoke certain routines running either in the client as part of the instructor application or as part of the simulator in the simulator server. These routines may receive as their input a value representing a desired condition of the patient, but not the necessary changes to the state variables of the model. By way of example, in a shock case the instructor my want to control the degree of hypovolemia. Hypovolemia may not be a state variable in the model. Instead, a software routine may include the necessary instructions for calculating necessary changes to e.g. blood pressure, respiration rate, skin temperature, pulse rate, and apply these changes to the state variables.

It will be understood by those with skill in the art that the presentation of a user interface that allows an instructor to perform high level adjustments to the state of the model may be combined with the presentation of a simulation prediction as described above, allowing the instructor to fine tune a simulation while it is ongoing, while constantly being presented with the expected outcome of the changes being made. However, the combined access to several variables through a routine that consistently applies changes to these variables based on the model itself and a desired high level adjustment of the state of the model finds useful application even in situations where the instructor is not presented with a prediction simulation.

Figure 9:
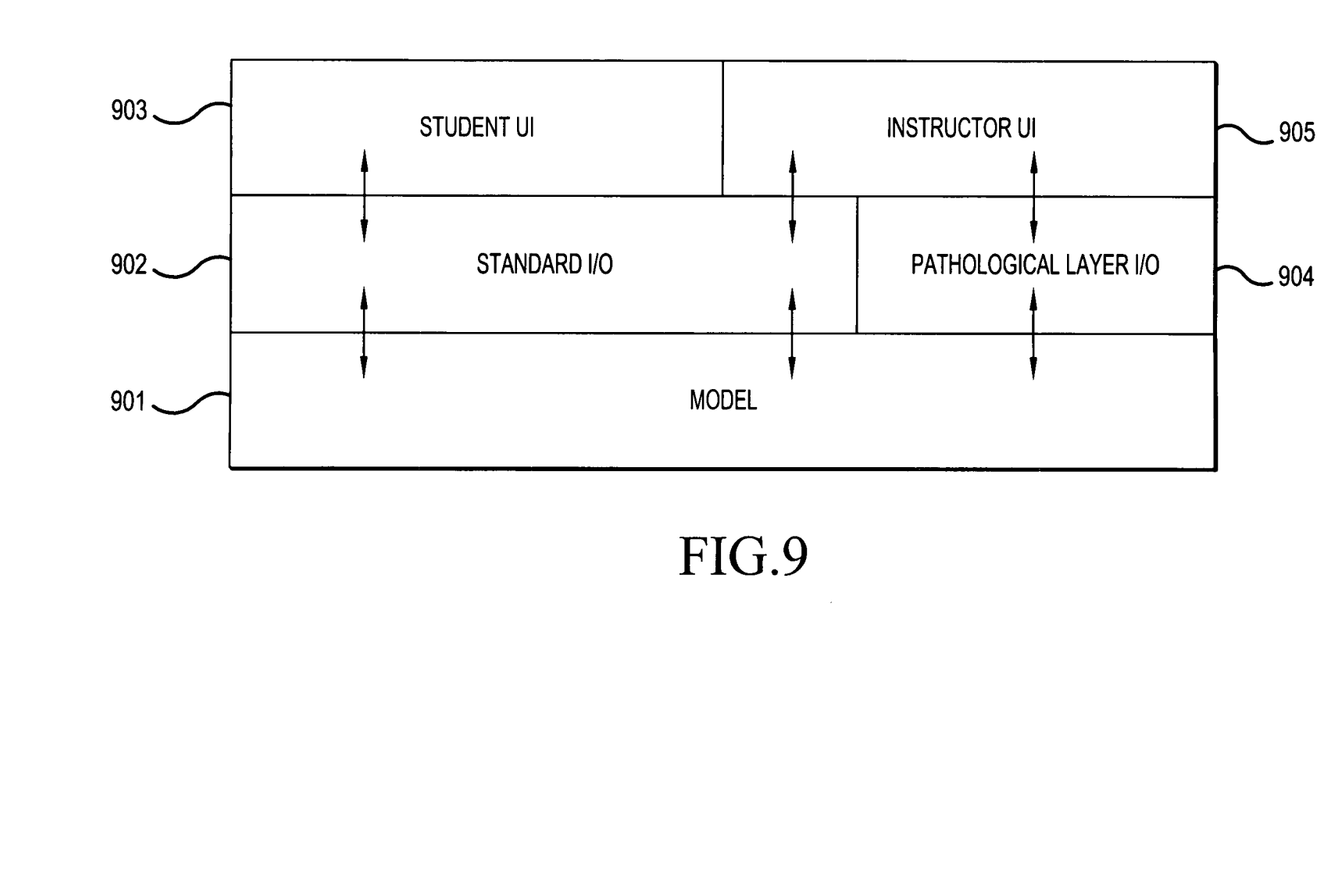
FIG. 9 shows a diagram illustrating an exemplary architecture of a computer simulation system with a module for translating user input into a modeled condition in the simulation.

Reference is now made to FIG. 9, which illustrates in a block diagram how high level interaction with the model can be implemented in accordance with certain aspects of the invention. The model is illustrated as a first layer 901. In order to simplify the description the model layer 901 may be considered as including simulator, model and state variables shown in FIG. 1, while the operating system and hardware layers are not shown.

In order to interact with the simulation a standard input output layer 902 is provided. This layer provides communication between the simulation running in the model layer 901 and a student user interface 903. The student user interface 903 may represent all the normal controls a user has access to during a simulation, and may include a graphical user interface displayed on a screen, as well as user input devices including a keyboard, mouse, joystick and other user controls relevant to the simulation. In addition to the standard input output layer 902, a second input output layer 904 may be provided. Continuing with examples related to medicine, this input output layer may be referred to as a pathological layer 904. The pathological layer 904 provides communication between the simulation model 901 and an instructor user interface 905. The instructor user interface may also receive data from and deliver user input to the standard input output layer 902.

With a user interface as that illustrated in FIG. 4, the student user interface 903 may correspond with the first user interface 401, while the instructor user interface 905 may correspond with the second user interface 402. Controls 414, 415 and 416 may then represent controls that interact with the model through the pathological layer 904.

However, rather than simply allowing the instructor direct access to state variables that are not directly accessible to the student, the pathological layer 904 may itself include one or more models of particular pathological situations or pathologies. (The word pathological is used to describe the medical examples provided herein, but in a simulation of e.g. a nuclear reactor, this layer would not include a model of a pathology but e.g. of some sort of crisis scenario.)

According to a first example, a pathology that can be manipulated by an instructor in this manner is hypovolemia. Hypovolemia is a state of reduced blood volume in the body, which is not directly measurable in a real patient. In order to diagnose hypovolemia, other symptoms must be evaluated, such as blood pressure, pulse pressure, heart rate, respiration rate, capillary refill, and consciousness level. Typically, a simulator will not provide a direct readout of blood volume, and there will be no possibility for a student to adjust blood volume directly. However, consistent with the principles of the present invention, a pathological layer between the model and the user interface may provide a connection between a user control in an instructor user interface and the variable or variables that represent the causes of the pathology.

According to this example an instructor may be provided with a control which allows him to adjust hypovolemia between e.g. 0% and 100%, representing total of whole blood volume lost (i.e. reduction of fluid in the blood stream). The pathological layer for hypovolemia may translate this to the appropriate adjustments in state variables representing blood plasma and other components of the blood. Consistent with the principles of the invention, the model may then react to these changes, and provided that the model is sufficiently precise, the appropriate changes in the state of other variables, such as heart rate, blood pressure etc., will result. This means that the model itself handles changes in blood pressure, pulse pressure, heart rate, respiration rate, total peripheral resistance, conscious level and eventually death based on the changes introduced through the pathological layer. This, again, will be available to the student as symptoms, which may be presented as values on a display, or symptoms generated on a manikin, as described above.

Based on an evaluation of the symptoms, the student may be able to treat the pathology successfully, for instance by providing appropriate antidote, surgery and/or blood transfusion. Such procedures will change the relevant variables of the model, which again may be reflected in a change in the user control in the instructor user interface. Continuing with the hypovolemia example, if the student performs volume resuscitation in the simulation, e.g. by giving the patient fluid (such as e.g. blood plasma or saline solution), the value of a variable representing amount of blood plasma (e.g. relative to normal) may be changed back towards normal as a result of the transfusion, and the patient's condition may improve. The pathological layer may then adjust the value of the hypovolemia input control back towards 0%. This also means that the instructor is able to increase the amount of hypovolemia during the simulation in order to make things more difficult for the student.

A result provided by the present invention is therefore that the instructor, or the designer of the scenario the student has to confront, does not have to adjust variables that represent the symptoms, which may be difficult and which may also result in a set of conditions or states in the model that do not adequately react to the students choices. Instead, the instructor changes the variables that are the physiological causes of the pathology, and the model provides the appropriate symptoms, as represented by the values of the output variables in the model. The model will therefore be able to respond correctly to the procedures performed by the student, even if the student makes a wrong decision. By way of example, if a student should choose to treat hypovolemia with epinephrine, the model may correctly simulate tachycardia (high heart rate), but the blood pressure will not improve much since there is little blood to pump around.

The flexibility and interactivity provided by the present invention is not limited to relatively simple pathologies such as hypovolemia. According to a second example, an input control provided to the instructor may represent anaphylaxis, which is a pathology model that controls the hearts contractility (ability to contract), total periphery resistance, airway complications and heart rate. The user interface may give the instructor the ability to adjust anaphylaxis between two extremes representing not present and fully present. The pathological layer for anaphylaxis may then translate this to relative changes in variables representing heart contractility, total periphery resistance, airway complications and heart rate.

Consistent with the principles of the invention, the changes to each variable may be absolute, relative to a normal value or relative to a current value. They can be linearly independent of each other and other variables of the model, or they may depend on one or more of each other or other variables in the model. By way of example, the pathological layer may include a function that takes the value of the input control and none, one or several current values of the state variables of the model as input and delivers changes to one or more state variables of the model as its output. As described with reference to the previous example, the function may be reversible in the sense that changes to the state variables involved in the pathology may be reflected in changes to the input control. In this respect the input control may also represent a high level output of a state in the model, as calculated from a number of variables in the model.

Other examples of pathologies that may be implemented in a pathological layer include opioid poisoning and severity of bleeding. Referring back to the simulation control area 803 illustrated in FIG. 8A, two high level controls representing such pathologies are shown there, namely opoid poisoning and severity of bleeding (or "bleeding rate"). A wide range of additional pathologies may, of course, be contemplated within the scope of the invention.

Consistent with the principles of the invention, the high level user input provided to an instructor by way of the pathological layer used in conjunction with the simulation prediction described above, provides the instructor with added flexibility and control when setting up and conducting a simulation session with one or more students. Since the adjustment of the pathology as well as the simulation prediction are both directly dependent on the simulation itself, the instructor will see a predicted outcome of any adjustment he may do to the pathology just as he may see an expected result of procedures and actions performed by students. And even though the predictions will be present even if no adjustments are made through a pathological layer, and similarly that adjustments to a pathology can be made without consulting a predicted outcome, the dynamic interaction of the two provides the instructor with freedom to interact with and dynamically change a training situation which may even involve several students running separate simulations on several devices, which may even be distributed throughout a training area.

Those with skill in the art will understand that the pathological layer described in the context of a medical simulation may also be used in other simulations. By way of example, a high level input layer may be used to describe a relationship between fundamental variables in a critical situation in a nuclear reactor. An instructor may then use a high level input control towards criticality or core meltdown without having to adjust and fine tune a number of parameters.

Similarly, such instructor input could be used in a flight simulator to initiate critical conditions in a damaged aircraft, or even to create a defined set of external conditions created e.g. by wind, precipitation, temperature etc.

What is claimed is:

1. A method for controlling a computer simulation, comprising:
    running a first computer simulation of a system based on a model of said system, said model having a plurality of state variables;
    receiving input data from a first user input interface, said input being representative of user interaction with said first computer simulation to change values of one or more said state variables in a manner consistent with an interaction with the simulated system;
    running, contemporaneously with said first computer simulation, a second computer simulation of said system based on the same model as said first simulation, said second simulation being accelerated relative to said first simulation so as to be running at further progression than said first simulation at a current time under the assumption of no further user interaction than those represented by the input data received from the first user input interface;
    using said second computer simulation to output information representing expected future events in said first simulation via a second user input interface;
    receiving input data from the second user input interface while said first computer simulation is running and said information representing expected future events is outputted, said input data received by the second user input interface adjusting the extent to which a condition is present in said first simulation; and
    translating, while said first computer simulation is running, said input from said second user input interface to values for one or more state variables in said first computer simulation consistent with a description of said condition in terms of rules embodied in the model,
    wherein output from said first computer simulation is delivered by a first data output device, and
    output from said second computer simulation, including said information representing expected future events, is delivered by a second data output device.

2. The method of claim 1, wherein said first user input interface is a student user interface and said second user input interface is a supervisor user interface.

3. The method of claim 1, wherein said condition is an undesirable condition that can be at least partly overcome or counteracted by data received from said first user input interface.

4. The method of claim 1, wherein said one or more state variables are integral parts of said simulation, and dynamically interacting with other state variables through rules embodied in said model.

5. The method of claim 1, further comprising translating the values of one or more state variables in said first computer simulation to a representation of the extent to which a condition is present in said simulation.

6. The method of claim 1, wherein said model is a description of a human physiology and said condition is a pathological state.

7. The method of claim 6, wherein said pathological state is chosen from the group consisting of: hypovolemia, anaphylaxis, opoid poisoning, and severity of bleeding.

8. The method of claim 1, wherein said model is a description of a nuclear reactor, and said condition is an unstable or critical condition in said reactor.

9. The method of claim 1, wherein said model is a flight simulator, and said condition is a malfunction of a plane or a severe weather condition.

10. A computer system, comprising:
    a first computer simulator configured to run a first simulation of a system based on a model of said system, said model having a plurality of state variables;
    a first user interface for receiving input data representative of user interaction with said first computer simulation to change values of one or more of said state variables in a manner consistent with an interaction with the simulated system;
    a first data output device delivering output from said first computer simulator;

a second computer simulator configured to run, contemporaneously with said first computer simulation, a second computer simulation of said system based on the same model as said first simulation, said second simulation being accelerated relative to said first simulation so as to be running at further progression than said first simulation at a current time under the assumption of no further user interaction than those represented by the input data received from the first user input interface, said second computer simulation being used to generate information representing expected future events in said first simulation;

a second user input interface for outputting said information representing expected future events, and for receiving input data while said first simulation is run and said information representing expected future events is outputted, said input data received by the second user input interface being used to adjust the extent to which a condition is present in said first simulation;

a second data output device delivering as output from said second computer simulator the information representing expected future events in said first simulation; and a module configured to, while said first simulation is running, translate said input from said second user input interface to values for one or more state variables in said first computer simulation consistent with a description of said condition in terms of rules embodied in the model.

11. The method of claim 10, providing said information representing expected future events in said first simulation on a display associated with said second user input interface.

12. The computer system of claim 10, wherein said first user input interface is a student user interface and said second user input interface is a supervisor user interface.

13. The computer system of claim 10, wherein said condition is an undesirable condition that can be at least partly overcome or counteracted by data received from said first user input interface.

14. The computer system of claim 10, wherein said one or more state variables are integral parts of said simulation, and dynamically interacting with other state variables through rules embodied in said model.

15. The computer system of claim 10, wherein said module is further configured to translate the values of one or more state variables in said first computer simulation to a representation of the extent to which a condition is present in said simulation.

16. The computer system of claim 10, wherein said model is a description of a human physiology and said condition is a pathological state.

17. The computer system of claim 10, wherein said pathological state is chosen from the group consisting of: hypovolemia, anaphylaxis, opoid poisoning, and severity of bleeding.

18. The computer system of claim 10, wherein said model is a description of a nuclear reactor, and said condition is an unstable or critical condition in said reactor.

19. The computer system of claim 10, wherein said model is a flight simulator, and said condition is a malfunction of a plane or a severe weather condition.

20. The computer system of claim 10, wherein said second data output device is associated with said second user input interface.

* * * * *